(12) United States Patent
Young et al.

(10) Patent No.: US 7,261,970 B2
(45) Date of Patent: Aug. 28, 2007

(54) NICKEL METAL HYDRIDE BATTERY DESIGN

(75) Inventors: Kwo Young, Troy, MI (US); Cristian Fierro, Northville, MI (US); Benjamin Reichman, West Bloomfield, MI (US); Michael A. Fetcenko, Rochester, MI (US); John Koch, West Bloomfield, MI (US); Avram Zallen, West Bloomfield, MI (US)

(73) Assignee: Ovonic Battery Company Inc., Rochester Hills, MI (US)

( * ) Notice: Subject to any disclaimer, the term of this patent is extended or adjusted under 35 U.S.C. 154(b) by 103 days.

(21) Appl. No.: 10/887,434

(22) Filed: Jul. 8, 2004

(65) Prior Publication Data

US 2005/0238959 A1    Oct. 27, 2005

Related U.S. Application Data

(60) Provisional application No. 60/565,170, filed on Apr. 23, 2004.

(51) Int. Cl.
*H01M 4/58* (2006.01)
*H01M 4/62* (2006.01)

(52) U.S. Cl. .................... 429/60; 429/217; 429/218.2; 429/223

(58) Field of Classification Search ............ 429/59, 429/60, 217, 218.2, 223
See application file for complete search history.

(56) References Cited

U.S. PATENT DOCUMENTS

| | | | |
|---|---|---|---|
| 3,951,686 A | 4/1976 | Ness et al. | |
| 3,959,018 A | 5/1976 | Dunlop et al. | |
| 4,004,943 A | 1/1977 | Boter | |
| 4,049,027 A | 9/1977 | Seiger | |
| 4,609,599 A | 9/1986 | Percheron et al. | |
| 4,847,174 A * | 7/1989 | Palmer et al. | 429/218.2 X |
| 4,935,318 A | 6/1990 | Ikoma et al. | |
| 5,032,475 A | 7/1991 | Hasebe et al. | |
| 5,131,920 A * | 7/1992 | Moriwaki et al. | 429/60 X |
| 5,344,728 A | 9/1994 | Ovshinsky et al. | |
| 5,348,822 A | 9/1994 | Ovshinsky et al. | |
| 5,498,403 A | 3/1996 | Shin | |
| 5,523,182 A | 6/1996 | Ovshinsky et al. | |
| 5,536,591 A * | 7/1996 | Fetcenko et al. | 429/59 |
| 5,695,530 A | 12/1997 | Hong et al. | |
| 5,773,163 A | 6/1998 | Suzuki et al. | |

(Continued)

*Primary Examiner*—Stephen J. Kalafut
(74) *Attorney, Agent, or Firm*—Robert J. Svoboda; Marvin S. Siskind (57) ABSTRACT

The present invention relates to rechargeable nickel metal hydride batteries and methods for making the same. More particularly, the present invention relates to rechargeable nickel metal hydride batteries having a precharge in the negative electrode sufficient for oxidation prevention in the negative electrode. The present invention discloses a nickel metal hydride battery, wherein the precharge of the negative electrode may be supplied by a variety of sources. The positive active material of the positive electrode may have positive active particles, such as nickel hydroxide, having a precursor coating that incorporates cobalt material capable of forming a conductive network. Sources other than cobalt-containing materials in the positive electrode include hydrogen gas provided directly to the negative active material, nickel aluminum mixed with the negative active material, the etching of the negative active material with an alkaline solution and borohydride chemically charging the negative active material. Preferably, a majority of the precharge of the negative electrode is supplied by sources other than cobalt-containing materials in the positive electrode.

23 Claims, 5 Drawing Sheets

U.S. PATENT DOCUMENTS

| | | |
|---|---|---|
| 6,042,753 A | 3/2000 | Izumi et al. |
| 6,268,083 B1 | 7/2001 | Iida et al. |
| 6,399,247 B1 * | 6/2002 | Kitayama et al. .... 429/218.2 X |
| 6,444,349 B1 * | 9/2002 | Berlureau et al. ............ 429/60 |
| 6,593,024 B2 * | 7/2003 | Fetcenko et al. ............. 429/60 |
| 2003/0031923 A1 * | 2/2003 | Aoshima et al. ........ 429/223 X |

* cited by examiner

The precharge was done by maintaining the hydrogen pressure at 0.1 atm.
The total precharge amount is about 56 mAh/g.

NICKEL METAL HYDRIDE BATTERY DESIGN

CROSS-REFERENCE TO RELATED APPLICATION

The present invention relates to, and is entitled to the benefit of the earlier filing date and priority of, U.S. Provisional Patent Application No. 60/565,170, filed Apr. 23, 2004, the disclosure of which is herein incorporated by reference.

FIELD OF THE INVENTION

The disclosure relates to rechargeable nickel metal hydride batteries and methods for making the same. More particularly, the disclosure relates to rechargeable nickel metal hydride batteries having a precharge in the negative electrode to prevent oxidation of the negative electrode and maintain long cycle life.

BACKGROUND OF THE INVENTION

Rechargeable batteries with high energy density, high capacity and long cycle life are highly desirable. Two types of alkaline rechargeable batteries commonly used are the Ni—Cd (nickel cadmium) type and the Ni—MH (nickel metal hydride) type. In both types of batteries the positive electrodes are made with an active nickel hydroxide material while the negative electrodes are different.

Ni—MH cells operate by a different mechanism than Ni—Cd cells. Ni—MH cells utilize a negative electrode that is capable of reversible electrochemical storage of hydrogen, hence the term hydrogen storage battery. The negative and positive electrodes are spaced apart in an alkaline electrolyte. Upon application of an electrical potential across a Ni—MH cell, the active material of the negative electrode is charged by the electrochemical absorption of hydrogen and the electrochemical discharge of a hydroxyl ion, as shown in equation 1.

The negative electrode half-cell reactions are reversible. Upon discharge, the stored hydrogen is released to form a water molecule and release an electron through the conduction network into the battery terminal.

The reactions that take place at the positive electrode of the Ni—MH cell are shown in equation 2.

The use of nickel hydroxide as a positive active material for Ni—MH batteries is generally known. See for example, U.S. Pat. No. 5,523,182, issued Jun. 4, 1996 to Ovshinsky et al., entitled "Enhanced Nickel Hydroxide Positive Electrode Materials For Alkaline Rechargeable Electrochemical Cells", the disclosure of which is herein incorporated by reference. In U.S. Pat. No. 5,523,182, Ovshinsky et al. describes a positive electrode material comprising particles of nickel hydroxide positive electrode material and a precursor coating of a substantially continuous, uniform encapsulant layer on the particles to increase conductivity and resistance to corrosion products. The encapsulant layer may be formed from a material which, upon oxidation during processing or during charging of the electrode, is convertible to a highly conductive form, and which, upon subsequent discharge of the electrode, does not revert to its previous form. The electrochemically active hydroxide may include at least nickel hydroxide and the encapsulant layer preferably includes cobalt hydroxide or cobalt oxyhydroxide.

Two primary forms of positive electrodes exist at present and include sintered and pasted type electrodes. Sintered electrodes are produced by depositing the active material in the interstices of a porous metal matrix followed by sintering the metal. Pasted electrodes are made with nickel hydroxide particles in contact with a conductive network or substrate, most commonly foam nickel or perforated stainless steel coated with nickel. Several variants of these electrodes exist and include plastic-bonded nickel electrodes, which may utilize graphite as a micro-conductor, and pasted nickel fiber electrodes, which utilize nickel hydroxide particles loaded onto a high porosity, conductive nickel fiber or nickel foam. The current trend has been away from using sintered electrodes in favor of pasted electrodes because of cost and because pasted electrodes can provide significantly higher loading.

Several processes for making positive electrodes are also generally known, see for example U.S. Pat. No. 5,344,728 issued to Ovshinsky et al., the disclosure of which is herein incorporated by reference, where electrodes having a capacity in excess of 560 mAh/cc are reported. The particular process used for making electrodes can have a significant impact on the electrode's performance. For example, conventional sintered electrodes may now be obtained with an energy density of 480-500 mAh/cc. Sintered positive substrates are constructed by applying a nickel powder slurry to a nickel-plated, steel base followed by sintering at high temperature. This process causes the individual particles of nickel to weld at their points of contact, resulting in a porous material that is approximately 80% open volume and 20% solid metal. The sintered material is then impregnated with active material by soaking it in an acidic solution of nickel nitrate, followed by conversion to nickel hydroxide in a reaction with alkali metal hydroxide. After impregnation, the material is subjected to electrochemical formation. Pasted electrodes may be made by mixing various powders, such as nickel hydroxide particles, binders and other additives into a slurry and applying the mixture to a conductive grid.

Production methods for making nickel hydroxide powder are generally known and such powder may be made using a precipitation reaction, such as the one described in U.S. Pat. No. 5,348,822, issued to Ovshinsky et al., the disclosure of which is herein incorporated by reference. In U.S. Pat. No. 5,348,822, Ovshinsky et al describes producing nickel hydroxide material by combining a nickel salt with a hydroxide to precipitate nickel hydroxide. Like electrode formation, the method for making the nickel active material can have a significant impact on properties and performance of the electrode.

Nickel hydroxide material should have high capacity and long cycle life. Excellent results have been found by forming nickel hydroxide with an apparent density of 1.4-1.7 g/cm³, a tap density of about 1.8-2.3 g/cm³, and an average size range of about 5-50 μm. Excellent results have also been found by making an active, nickel hydroxide with a high packing density and a narrow size distribution, such as may be provided with substantially spherical particles having an average particle size of about 10 μ and a tap density of about 2.2 g/cc. Paste made with this kind of active material has good fluidity and uniformity, making it possible to fabricate high capacity, uniformly loaded electrodes. The use of this kind of active material also improves utilization and discharge capacity. However, if process conditions are not carefully controlled, the resulting precipitate may be irregular in shape and have a low tap density. Electrodes formed with low-density nickel hydroxide will lack high capacity and high energy density. Improper process conditions can also produce a powder that is too fine. A very fine powder will increase adsorption of water at the surface of the particles, thereby requiring longer filtering times. Further, if process conditions are not properly controlled, precipitated particles may be formed with an excessively wide particle size distribution (ranging from 1 to hundreds of microns). Nickel hydroxide made with an excessively wide particle size distribution may require additional processing, such as pulverization, to render it useful. For these reasons and others, active powder having a low density, irregular shape and/or poor size distribution is undesirable for use in a high capacity nickel metal hydride battery.

To produce high density, substantially spherical nickel hydroxide powder, carefully controlled process conditions are used to seed and gradually grow nickel hydroxide particles. Although process conditions can vary, generally the process involves combining a nickel salt with an ammonium ion to form a nickel-ammonium complex. The nickel-ammonium complex is then broken down, typically with caustic, to gradually precipitate nickel hydroxide. However, this reaction rate is difficult to control, so methods have been introduced to separate certain steps in the production process. For example, U.S. Pat. No. 5,498,403, entitled "Method for Preparing High Density Nickel Hydroxide Used for Alkali Rechargeable Batteries", issued to Shin on Mar. 12, 1996, the disclosure of which is herein incorporated by reference, discloses a method for preparing nickel hydroxide from a nickel sulfate solution using a separate or isolated amine reactor. Nickel sulfate is mixed with ammonium hydroxide in the isolated amine reactor to form a nickel ammonium complex. The nickel ammonium complex is removed from the reactor and sent to a second mixing vessel or reactor where it is combined with a solution of sodium hydroxide to obtain nickel hydroxide. The nickel hydroxide particles may then be formed into a pasted electrode with suitable binders, additives, conductive powders, etc. The electrode is then combined with a negative electrode, separator and a suitable electrolyte to form a hydrogen storage battery.

One useful form of hydrogen storage battery is the sealed type. Sealed batteries typically use a small amount of liquid and operate in what is called a starved condition. These types of batteries are particularly advantageous since they are maintenance free. However, sealed hydrogen storage batteries are vulnerable to degradation during cycling, particularly, during overcharging and overdischarging conditions. During overcharge the positive electrode produces oxygen and then recombines at the negative electrode with hydrogen. This localized heating in turn lowers the oxygen evolution potential at the surface of the positive electrode and thereby causes excess gas evolution to occur during overcharge, primarily hydrogen gas. The end result is a build-up and venting of hydrogen resulting from gas being generated at a rate faster than can be recombined within the battery. As a consequence, the venting of hydrogen systematically reduces battery cycle life through oxidation of the negative active material and active material disintegration, loss of electrolyte as well as cell capacity, increased cell impedance due to separator dry-out, and effects the balance between the overcharge and over-discharge reservoirs.

To reduce the potential for oxidation of the negative active material and minimize gas evolution, current practice is to make hydrogen storage batteries that are positive limited, e.g. have a positive electrode capacity, which is smaller than negative electrode capacity. Excess negative capacity prevents the negative electrode from becoming fully charged and ideally permits oxygen produced at the positive electrode to easily recombine at the surface of the negative electrode according to the following reactions:

However, positive limiting a battery alone does not prevent premature failure due to complications from over charging or overdischarging . Other mechanisms exist that can lead to premature failure of the battery.

In a pasted type nickel electrode for an alkaline storage battery, the conductive substrate may be made by forming a nickel-plating over a base urethane foam having a high degree of porosity. The urethane is later burned off in an annealing step leaving a nickel skeleton frame of pores. These pores can be several hundred millimeters across and can be filled with a large number of active material particles in each pore of the foam substrate. The greater the pore size the greater the number of active material particles per pore. However, pore size can also affect the distance between particles, and the distance between particles and the conductive substrate. An unoptimized pore size can lead to higher resistivity of the electrode thereby reducing the utilization of the active materials.

In order to reduce electrode resistivity various additives can be added to the active material powder, such as metal cobalt or cobalt compounds. Subsequent electrical formation of the battery causes the above-mentioned metal cobalt and cobalt compounds to be oxidized to β-CoOOH by charging, thus increasing the conductivity of the electrode and improving the utilization of the active materials. These additives, comprising as much as 5-15%, create a conductive network between adjacent active material particles and the foam substrate.

However, even when the correct addition of metal cobalt or cobalt compounds as conductive agents is provided in the positive paste, there can still be problems with the pasted positive electrode when used in an alkaline storage battery. For example, the efficiency of the positive active material in the electrode can be affected during charging under high temperature conditions. During battery formation the cobalt additives dissolve in the alkaline electrolyte solution and re-deposit as cobalt hydroxide on the surface of the active material. However, when the cobalt hydroxide deposits, it does not happen uniformly, causing segregation on the surface of the electrode and only a small part of the cobalt hydroxide diffuses in the pore, thereby reducing the conductivity of the electrode. In addition, charging the positive at elevated temperatures also decreases the oxygen overvoltage potential in the positive electrode. This decreased in the oxygen over-voltage potential changes the point where the side reaction at which oxygen evolution occurs and as a result decreases the charge efficiency characteristics of the active material.

In recent years, much work has been devoted to the positive pasted electrode in an effort to try to reduce the amount of cobalt additives in the positive paste thereby reducing the cost of the battery. However, reducing these conductive additives has also led to poor cycle life, higher internal pressure and loss of capacity.

As a result of the forgoing, there exists a need for an alkaline battery that reduces the amount of cobalt additives in an alkaline storage while maintaining comparable cycle life, cell performance and charge balance.

SUMMARY OF THE INVENTION

Disclosed herein is a nickel metal hydride battery having a sufficient negative electrode precharge to facilitate formation and prevent unnecessary oxidation. Preferably, the precharge is supplied from sources other than cobalt additives, as well as, cobalt additives. More preferably, a majority of the precharge is supplied from at least one source other than cobalt additives. Further, disclosed herein is a nickel metal hydride battery wherein a precharge in the negative electrode of the battery is designed to provide a balance between the overcharge and over discharge reservoirs during formation and also throughout the life of the cell.

Also disclosed herein is a method of making a preferred nickel hydroxide material by forming a precursor oxidized cobalt coating on the nickel hydroxide material.

Also disclosed herein is a preferred positive electrode that includes a non-oxidizable binder. The non-oxidizable binder is preferably alcohol-free and water based.

Also disclosed herein is a nickel metal hydride battery having a negative electrode electrochemically coupled to a positive electrode, the negative electrode having a sufficient precharge as required for long cycle life. Preferably, a majority of the precharge may be supplied from sources other than the cobalt additives, wherein the sources other than cobalt additives may be used alone or in combination with one another.

Also disclosed herein is a nickel metal hydride battery having a negative electrode and an electrolyte, wherein a sufficient amount of oxidizable additive(s) is contained within the negative electrode to form a sufficient precharge as required for long cycle life. Preferably, the oxidizable additive is a compound that has a portion, which leaches harmlessly into the electrolyte to avoid poisoning the nickel metal hydride battery.

Also disclosed herein is a method of making a nickel metal hydride battery comprising providing a positive electrode having a positive electrode material, providing a negative electrode having a negative active material, an overcharge reservoir, an overdischarge reservoir and one or more cobalt additives and sources other than the cobalt additives to provide a precharge sufficient for long cycle life.

Also disclosed herein is a method of making a nickel metal hydride battery comprising providing a positive electrode having a positive electrode material and cobalt additives, providing a negative electrode having a negative active material, an overcharge reservoir, an overdischarge reservoir and a sufficient amount of additives that when considered in combination with the cobalt additives, produce a precharge sufficient for long cycle life in the negative electrode upon initial activation of the positive electrode. Preferably, the additives provide a majority of the precharge to the negative electrode.

Also disclosed herein is a method of making a positive electrode material, which includes the encapsulation of the positive electrode active material. The encapsulant layer preferably includes cobalt hydroxide or cobalt oxyhydroxide.

Also disclosed herein is a method of making a positive electrode material that provides a uniform distribution of a cobalt network, reduces gas evolution, and provides resistance to corrosion products for internal pressure reduction and stability, while using a decreased amount of CoO and $Co(OH)_2$ in the electrode preparation and delivering the same, or increased utilization without a decrease in specific capacity.

Also disclosed herein is a method of making positive electrode particles, which include at least one electrochemically active hydroxide, surrounded by a substantially continuous, uniform, encapsulant layer. This encapsulant layer may be formed from a material that upon oxidation during processing or during charging becomes conductive, and does not revert to its precharge form upon subsequent discharge. Preferably, the electrochemically active material is a nickel hydroxide material that includes co-precipitated cobalt and zinc.

Also disclosed herein is a method of making a positive electrode active material for use in electrochemical cells. This material comprises particles of positive electrode material including at least one electrochemically active hydroxide and a substantially continuous, substantially uniform, encapsulant layer surrounding the particles of positive electrode material. The encapsulant layer is formed from a material which, upon oxidation during processing or during charging of the electrode, is convertible to a highly conductive form, and which, upon subsequent discharge of the electrode, does not revert to its previous form. The encapsulant layer is preferably formed from at least cobalt hydroxide, cobalt oxyhydroxide, but may include other hydroxides, or oxides, such as manganese hydroxide or manganese oxide. Preferably, the method of making the positive electrode material comprises mixing positive active particles, such as triprecipitate nickel hydroxide particles, with an encapsulating material, under conditions that cause the encapsulating material to substantially uniformly encapsulate the active particles while being oxidized. The process may include heating to facilitate the desired reaction in the presence of a base. The encapsulant layer process may include forming in the presence of an oxygen gas.

Also disclosed herein are various methods of providing precharge to the negative electrode. One method includes adding a sufficient amount of cobalt additives to create a conductive network throughout the positive electrode then charging the positive electrode to create a precharge in the negative electrode. Another method is precharging the negative material by exposing the negative material to hydrogen gas. Another method includes reducing the negative material by chemically reducing the negative active material with a sufficient amount of reducing additive in the negative electrode. Another method includes reducing the negative material by chemically reducing the negative active material through etching with an alkaline solution. Another method includes reducing the negative material by chemically reducing the negative active material through reacting the negative active material with a strong reducing agent in the presence of water. The various methods may be used in combination.

Also disclosed herein is a nickel metal hydride battery having reduced cobalt additives and at least one additive other than cobalt that enables the battery to perform at a level equivalent to or superior to similar batteries having a greater amount of cobalt additives. The present invention allows for a reduction in the total cobalt used in the electrode, which reduces the cost of production. This allows for a greater percentage of nickel hydroxide active material to be used in the electrode. Thus, a high percentage utilization of the nickel hydroxide material is achieved because there is good electrical interconnection between particles and between the particles and the substrate. Additionally, increased energy density is also achieved because the amount of cobalt used to achieve the interconnection is reduced allowing for more active material to be incorporated.

BRIEF DESCRIPTION OF THE DRAWINGS

In order to assist in the understanding of the various aspects of the present invention and various embodiments thereof, reference is now be made to the appended drawings, in which like reference numerals refer to like elements. The drawings are exemplary only, and should not be construed as limiting the invention.

DETAILED DESCRIPTION OF THE INVENTION

The hydrogen storage battery of the present invention includes a negative electrode with a negative electrode capacity; a positive electrode with a positive electrode capacity, an electrolyte, a separator, an overcharge reservoir, an overdischarge reservoir; wherein the overcharge reservoir and the overdischarge reservoir are balanced and the negative electrode is supplied with a sufficient precharge to maintain the cell balance.

The negative electrode preferably includes one or more electrochemical negative active materials selected from the group of hydrogen storage alloys including $AB_2$, modified $AB_2$, TiZrVNiCr, modified TiVNiZr materials, $AB_5$, modified $AB_5$, and other $AB_x$, materials.

The positive electrode may include an active material, binder and additives. The positive electrode is preferably a non-sintered nickel electrode having a plurality of preoxidized active material particles. The preoxidized particles preferably include nickel hydroxide and nickel oxyhydroxide. The preoxidized particles may also include additives such as cobalt hydroxide and cobalt metal and other additives to produce a precharge section in the negative electrode upon initial charge of the positive electrode.

The hydrogen storage battery is preferably positive limited, e.g. the negative active material is provided with excess capacity in relation to the positive active material. The excess negative capacity has two primary functions: to provide an overcharge reservoir for preventing high pressure generated during charge and overcharge, and to provide an overdischarge reservoir for protecting the negative electrode from oxidation during forced overdischarge. The ratio of negative capacity to positive capacity (or n/p ratio) is preferably greater than 1.0. The n/p ratio is preferably less than 3.0, preferably less than 2.0, more preferably less than 1.8 and more preferably less than 1.5. A preferred n/p ratio range is 1.1 to 2.0. By balancing between cell capacity and cycle life performance, a preferred n/p ratio can be obtained. Further, by fixing the relative ratio of negative capacity to positive capacity, oxygen/hydrogen recombination at the negative electrode may be achieved with substantially no net pressure increase during low rate overcharge, i.e. at a charge rate of less than 0.1 C. Further, it may also be expected that substantially no net pressure increase will occur during forced low rate overdischarge, as hydrogen gas generated at the positive electrode may be absorbed at a complementary rate by the negative electrode.

It has been found that positively limiting a battery alone, does not adequately consider the distribution of capacity between the overcharge reservoir (extra negative electrode capacity during overcharge) and overdischarge reservoir (extra negative electrode capacity during overdischarge). It has also been found that improper reservoir balance may detrimentally effect cycle life. Improper reservoir balance can occur when oxidizable additives, such as Co, $Co(OH)_2$ and CoO, are added to the positive electrode to form a conductive network. Poor reservoir balance can also occur during irreversible formation of Ni to a higher than $3^+$ oxidation state. In such cases charge balance between the positive and negative electrode is detrimentally altered through a one time charge of the negative electrode. The one time charge reduces the amount of negative electrode overcharge reservoir or "OCR". The loss in OCR, in turn, reduces the ability of the battery to recombine hydrogen, leading to eventual cell failure. By properly balancing capacity between the overcharge reservoir and overdischarge reservoir, long cycle life can be obtained.

Conventional battery formation includes both thermal activation and electrical formation. The former may be a few days storage at room temperature or medium temperature oven (for example 60° C.) and the main purpose is to dissolve the native oxide on the negative electrode surface and form a porous layer of oxide as a catalyst. In the mean time, the Co and CoO additives are transformed into $Co^{2+}$, which has a limited solubility. The oxidation of Co metal creates hydrogen gas in the cell and contributes to the negative electrode precharge to prevent the oxidation of the negative electrode under an unfavorable potential. The main purpose of electrical formation is to form a continuous, highly conductive CoOOH coating on the surface of positive electrode. During this process, the surface area of negative electrode also increases dramatically to improve the high power discharge performance.

The positive electrode preferably includes at least one electrochemically non-active additive to improve conductivity, corrosion resistance, active material utilization, cycle life, etc. During initial charging, some of these electrochemically non-active additives will oxidize before nicker hydroxide. The oxidation of these additives, while not electrochemically reversible, provides a corresponding one-time charge to the negative active material. These additives do not add capacity, yet result in altering the distribution of OCR and over discharge reservoir (ODR) in the negative electrode. However, it has been found that oxidizing the additives after electrode formation and even after cell formation does provide a substantial benefit. For example, nickel hydroxide is an essentially non-conductive material. To improve conductivity Co-additives, such as Co, $Co(OH)_2$ and CoO, are mixed with nickel hydroxide particles. During initial cell cycling the additives may dissolve and precipitate to integrally form a conductive CoOOH network about the nickel active material, thereby greatly enhancing conductivity. It is believed that preoxidizing these additives prior to initial cell cycling may prohibit this integral formation. To overcome the net charge reduction in the positive electrode in favor of the negative electrode and permit formation of the conductivity network a compensating "positive precharge" may be added to the battery. By compensating for the one time charge to the negative active material during irreversible oxidization of the additives, the loss of overcharge reservoir occurring during initial cycling can be substantially reduced. The benefits are maintaining long cycle life to (400 cycles or greater) 400, 600, 800, 1000 or more and reducing the overall cobalt content, which lowers the production cost.

The positive electrode active material for use in the electrochemical cell may comprise particles of positive electrode material including at least one electrochemically active hydroxide and a substantially continuous, uniform, encapsulant layer surrounding the particles of positive electrode material. The encapsulant layer is formed from a material which, upon oxidation during processing or during charging of the electrode, is convertible to a highly conductive form, and which, upon subsequent discharge of the electrode, does not revert to its previous form.

When a precursor coating of Co additives is applied to a NiMH battery, the positive electrode is prepared for discharge immediately after assembly of the cell. In other words, the activation process is simplified. However, without the initial contribution to the negative precharge due to the oxidation of Co and CoO, the negative electrode is put into a oxidizable potential in the beginning and part of negative electrode is inevitably oxidized to create enough hydrogen pre-charge and lower the potential of negative electrode. This unnecessary oxidation will reduce the negative electrode capacity, increase the surface impedance, and extend the formation process. As a result, the present disclosure discloses a precharge in the negative electrode that is designed to be put in during the powder preparation to avoid the adverse effect brought by the newly developed precursor coating described below.

Figure 1A:
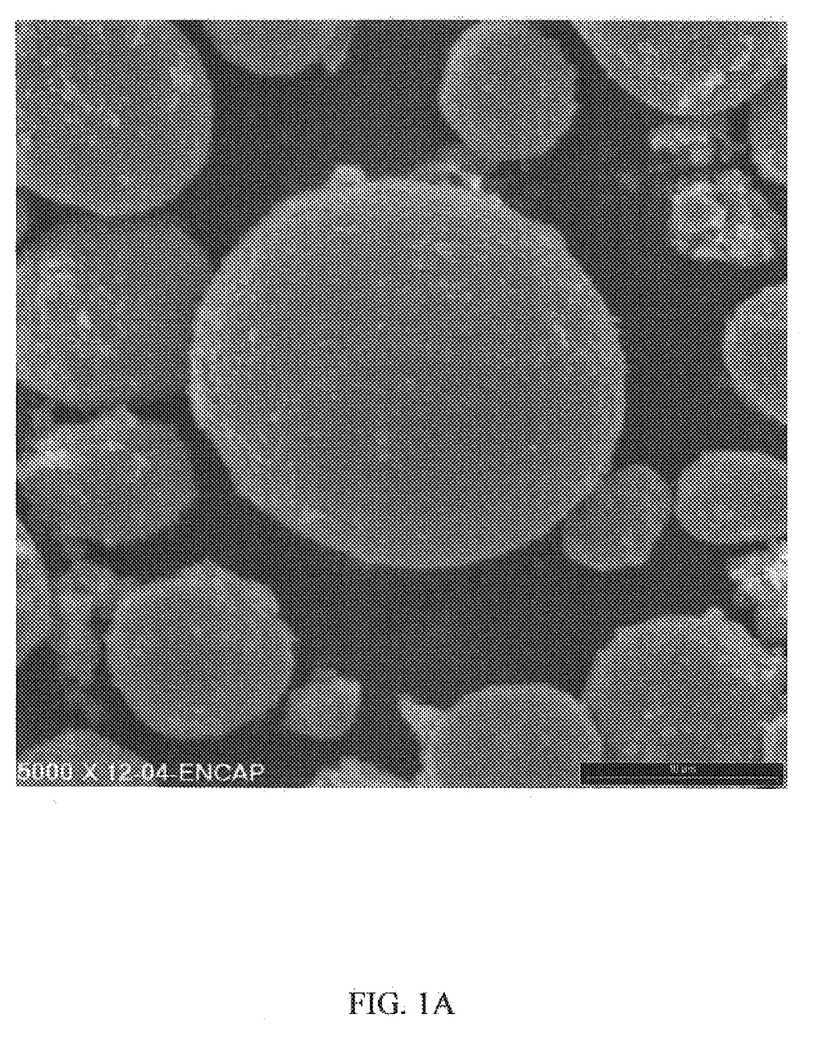
FIG. 1A is a magnified view of encapsulated nickel hydroxide material formed by using an encapsulation procedure disclosed herein.
Figure 1B:
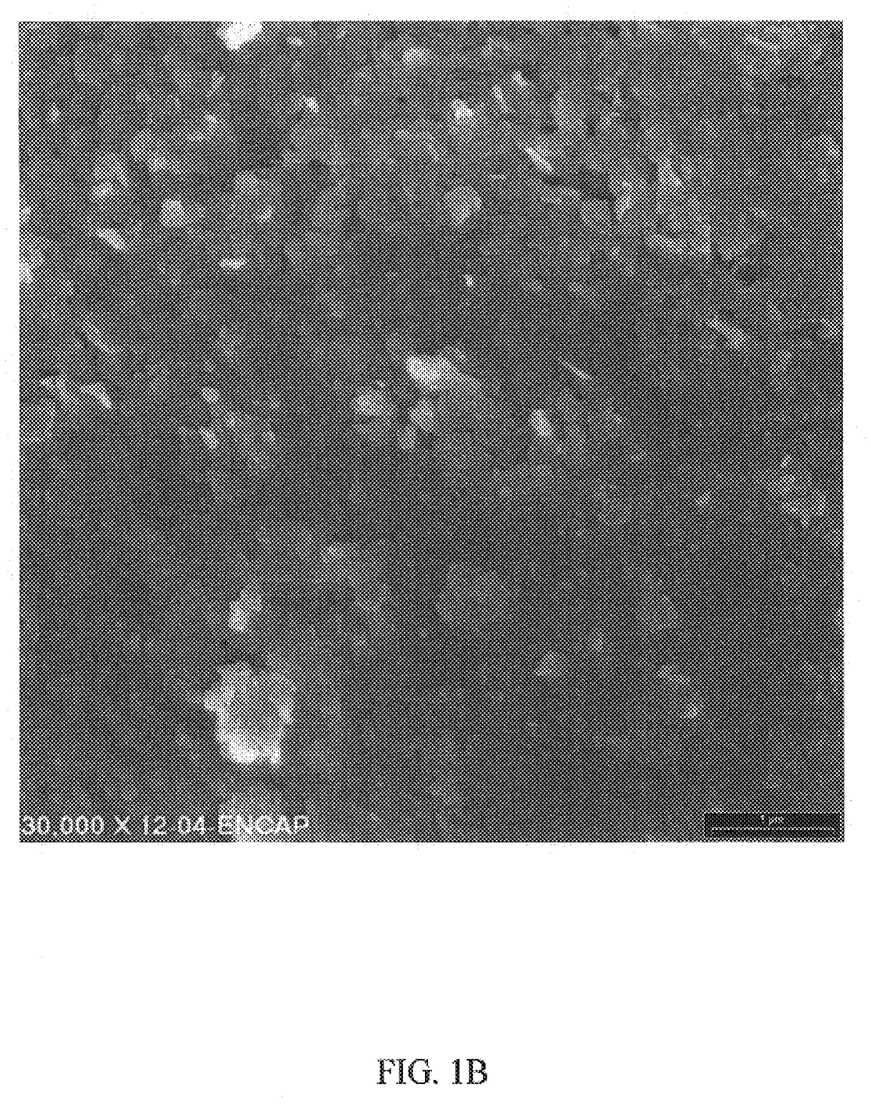
FIG. 1B is a magnified view of FIG. 1A.
Figure 4:
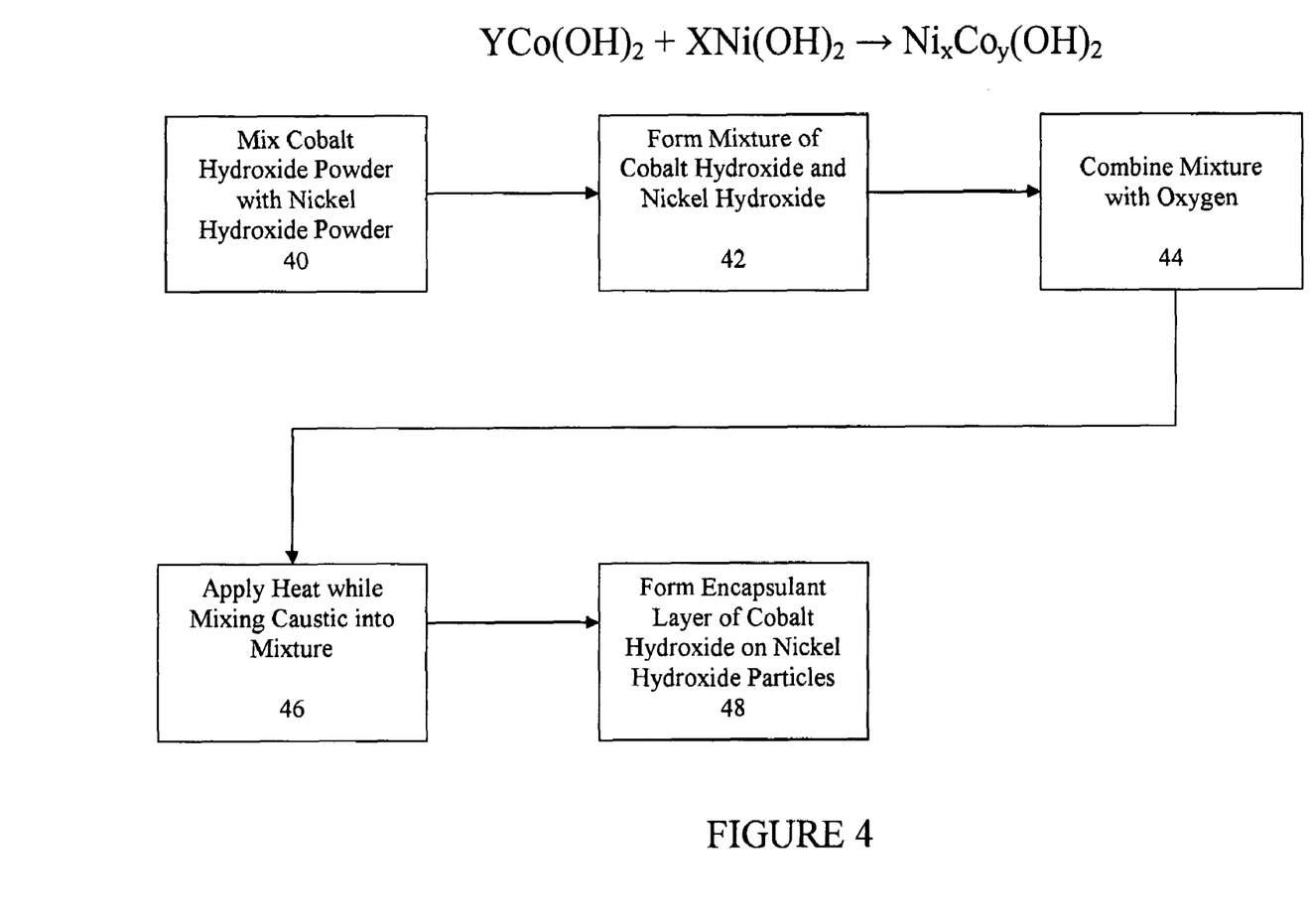
FIG. 4 is an illustration of mixing cobalt hydroxide powder and nickel hydroxide powder.

The encapsulant layer is preferably formed from at least cobalt metal, cobalt hydroxide, cobalt oxyhydroxide, manganese hydroxide, or a manganese oxide. As disclosed herein, the encapsulant layer is a precursor coating and may be formed around the positive active particles, prior to the assembly of the cell. The nickel hydroxide encapsulation process is illustrated in FIG. 4. The encapsulant layer is formed on the positive active particles by mixing positive active particles, such as nickel hydroxide in FIG. 4, with an encapsulant material, such as cobalt hydroxide in FIG. 4. The positive active particles may include modifiers, such as compositional modifiers and chemical modifiers. The dry particles of positive active material and encapsulant material may then be heated when a caustic solution, such as sodium hydroxide, is added to the mixture. The caustic solution should be of sufficient amount and concentration to dissolve the encapsulant material. The mixture and caustic are preferably mixed at a rate, for a time and at a temperature that causes the encapsulant material to dissolve and encapsulate the positive active material. Oxygen may then be introduced into the mixture to oxidize the encapsulant layer. Preferably, oxygen is added until all encapsulant material in the encapsulated layer is oxidized to maximize the conductive network. The oxygen supplied to oxidize the encapsulant layer may be supplied by performing the method in air during the mixing of the mixture and caustic, which partially oxidizes the encapsulant layer. Preferably, oxygen is introduced by both mixing the mixture and caustic in air and introducing oxygen gas after the encapsulant layer is formed. Preferably, the mixture and caustic are continually mixed and heated during the addition of caustic and oxygen to facilitate the desired reactions. FIGS. 1A and 1B are magnified photographs of nickel hydroxide particles encapsulated by cobalt hydroxide using the procedure detailed above. FIGS. 1A and 1B show that the cobalt hydroxide powder has dissolved and the nickel hydroxide particles remained. The encapsulant layer may be formed by other methods, such as the method disclosed in U.S. Pat. No. 5,523,182, issued Jun. 4, 1996 to Ovshinsky et al., entitled "Enhanced Nickel Hydroxide Positive Electrode Materials For Alkaline Rechargeable Electrochemical Cells", the disclosure of which is herein incorporated by reference.

Figure 2:
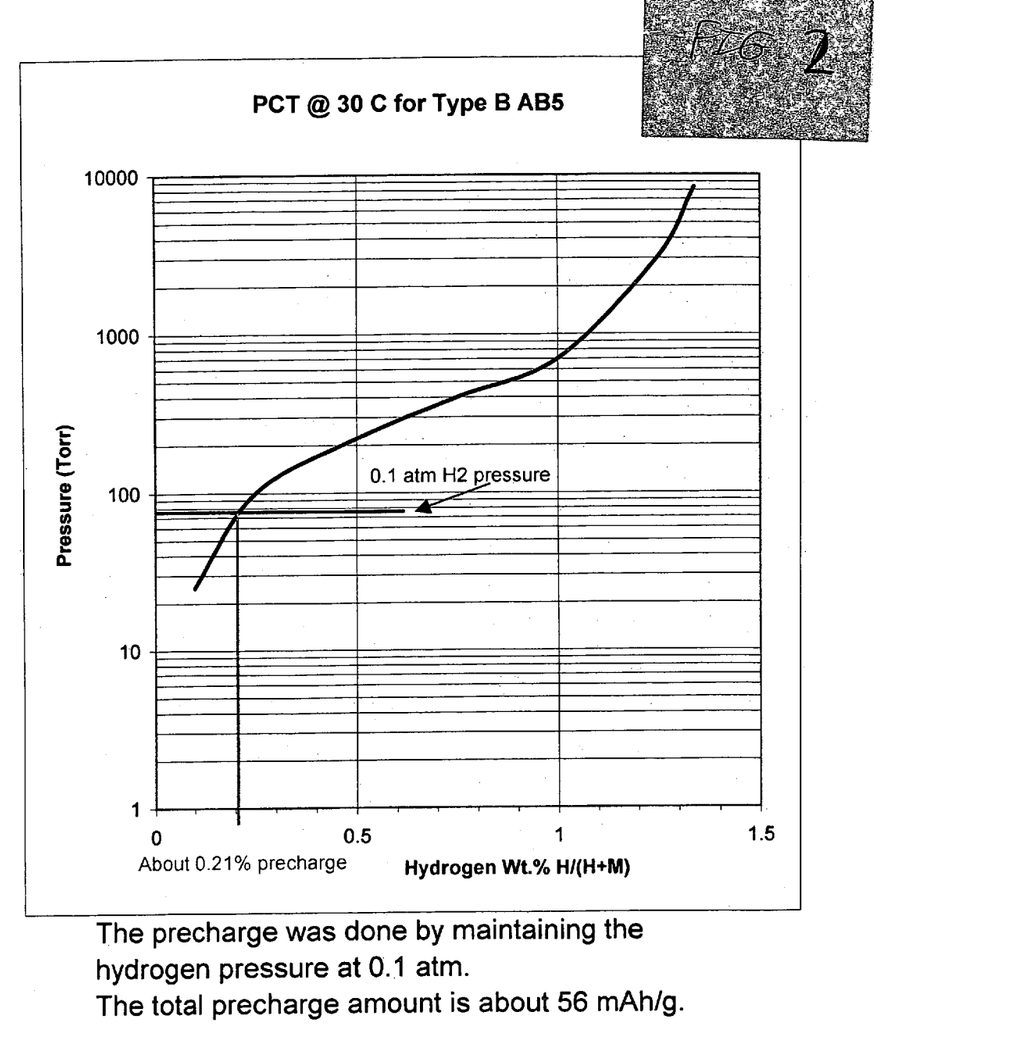
FIG. 2 is a pressure-concentration isotherm curve (PCT) to determine the equilibrium hydrogen pressure corresponding to a designed precharge level.

A precharge level may be predetermined by the design of cell balance to achieve goals of high capacity, high cycle life, and ease of formation. A pressure-concentration isotherm (PCT) curve may be used to determine the equilibrium hydrogen pressure corresponding to the design precharge level, as illustrated in FIG. 2. As an example, an equilibrium pressure of about 0.1 atmosphere will correspond to a 0.21 wt. % precharge in the negative electrode active material. Powder, less than 200 mesh, was prepared by induction melting, annealing at 900-1100° C. for 2 to 20 hours, crushed, ground, and sieved in a protective argon or nitrogen atmosphere. Then, the prepared powder was placed back in a hydrogen reactor cylinder. The system was pumped and flushed with argon gas three times and followed by a heating to 50° C. in 1 atm hydrogen gas to activate. Once the power was activated from the observation of temperature raise and hydrogen pressure reduction, the supply hydrogen flow was controlled to maintain a pressure at the designed value (0.1 atm in this example). The heater was turned off and the powder was slowly cooled down to room temperature at that equilibrium pressure. As the temperature of the powder reached room temperature, the precharge process was completed.

In a preferred embodiment, the precharge section of the negative electrode is predominantly supplied by sources other than the cobalt additives. The precharge section of the negative electrode is supplied by at least one additive to either the negative electrode or the positive electrode, depending on the additive(s).

At the initial charge, the cobalt and/or cobalt hydroxide contained in the positive electrode is charged first to produce stable oxide, such as $Co_2O_3$, because its oxidation potential is lower than that of $Ni(OH)_2$ and/or nickel oxides. This specific stable cobalt oxide will have nothing to do with subsequent discharge and charge. The negative electrode, which acts to absorb hydrogen, will be partially charged by the quantity of electricity necessary for oxidation of the cobalt and/or cobalt hydroxide at the initial charge. The initial charge forms a portion of the precharged section at the negative electrode, the portion corresponding to the charging quantity of electricity of the cobalt and/or cobalt hydroxide. The remainder of the precharge section is supplied by sources other than cobalt additives, such as a sufficient amount of NiAl in the negative electrode material, exposing the electrodes to hydrogen gas, etching the negative material with an alkaline solution and chemically charging the negative electrode with a borohydride, all of which are described below. As a result, battery capacity is limited with the positive electrode capacity to obtain a high capacity sealed type nickel-hydride battery having a long cycle life.

The negative electrode may receive a precharge by chemically reducing the negative active material. In one embodiment, NiAl powder is added to negative active material paste to produce a precharge in the negative electrode. Upon contacting an electrolyte, such as KOH or NaOH, with a negative active material containing NiAl, the aluminum in the NiAl of the negative active material reacts with the electrolyte to release hydrogen gas. The reaction may be written as:

The hydrogen gas may be absorbed into the metal hydride negative material in contact with the Ni—Al powder. The dissolution of aluminum leaves behind a high surface area nickel (Raney nickel) in intimate contact with the metal hydride material. Table I below shows the pre-charge measured in the negative electrodes, which included different levels of Ni—Al powder, wherein the percent of precharge is based upon a negative electrode capacity of 320 mAh/g and the cells have a negative/positive (N/P) ratio of 1.5. The measurements were performed 20 hours after the electrodes were dipped in the KOH electrolyte at room temperature.

TABLE I

| Percent (%) Ni—Al added | Open circuit potential | Amount of pre-charge (mAh/g) | Percent (%) of pre-charge |
|---|---|---|---|
| 0 | 0.371 | 0 | 0 |
| 5 | −0.839 | 19 | 6 |
| 10 | −0.895 | 73 | 23 |
| 36 | −0.905 | 162 | 50 |

As Table I shows, the amount of pre-charge introduced into the negative material increased as the amount of Ni—Al additive increased. Other elements or compounds, which can release hydrogen upon coming in contact with alkaline solution (thus charge the negative electrode material) can be used. Alkaline metals such as Li, K, Na may be used in combination with the negative metal hydride material. Alkaline earth elements (Ca, Mg etc) can also be used for the same purpose.

In another embodiment, the negative electrode precharge may be supplied in full or part by exposing the negative active material to hydrogen gas, prior to formulation of the negative electrode. For example, $AB_5$ powder was partially pre-charged by exposing it to hydrogen gas. Electrodes were prepared from the pre-charged powder according to the following procedure:

1. The pre-charged powder was mixed with water (300 g/1Kg water) in a glove box free from oxygen.
2. The wet powder was loaded into a paste mixer (in air) to which the standard paste additives (Carbon, Carboxymethyl Cellulose (CMC), PSA) and then PTFE binder were added. A total mixing time of 3 hours was used.
3. Electrodes having a thickness of 7.2 mm were pasted and then dried in air. Some electrodes were dried in an oven at 80° C. under ambient atmosphere for faster processing. Electrodes were then tested for electrochemical performance and for excess charge determination.

Table II shows results from electrodes using negative material, which was precharged to about 15% of its full capacity.

TABLE II

| Electrode | O.C. potential (V) | Pre-charge (mAh/g) | % Pre-charge |
|---|---|---|---|
| Control, air dried | 0.371 | 0 | 0 |
| Pre-charged, air dried, batch 1 | −0.867 | 49 | 15 |
| Pre-charged, air dried, batch 2 | −0.894 | 56 | 17.5 |
| Pre-charged, oven dried, batch 2 | −0.885 | 40 | 12.5 |
| Pre-charged, oven dried, batch 2, 1 day stored in air | −0.875 | 23 | 7.2 |
| Pre-charged, oven dried, batch 2, 4 days in air | −0.835 | 5 | 1.5 |
| Pre-charged, air dried, batch 3 | | 39 | 12 |
| Pre-charged, air dried, batch 3, stored in Glove Box 3 days | | 39 | 12 |
| Pre-charged, air dried, batch 3, stored in air 3 days | | 7 | 2 |

Table II gives an example, which shows that drying the pasted electrode at 80° C. in air verses in an oven does not effect the stored charged and it is similar to the charge measured in electrode that was dried in air at ambient temperature (see batch 2 example). The table also shows examples of longer term stability during storage of the pre-charged electrode (examples from batches 2 and 3). The stored charge decreased during storage of the electrode in air and after 4-5 days of storage it decreased to zero, however storage in inert atmosphere inside a glove box was effective in maintaining the stored charge (batch 3).

In another embodiment, a precharge in the negative electrode may be supplied by etching the negative active material with electrolyte to introduce the precharge. Some of the elements of the negative materials in misch metal $AB_5$ alloys (rare earth elements such as La, Ce, etc.) or in $AB_2$ alloys (transition metal elements such as Zr, V, Mn, etc. . . . ) can also react with alkaline solution in a reaction, which produces hydrogen that may be absorbed into the negative active material. However, the reaction of these elements is slower compared to the alkaline metals described earlier because of their oxidation/passivation and because they are in alloys and not free elements. To increase the rate of reaction, these negative materials may be heated in alkaline solution at higher concentrations and temperatures in an etching process that results in pre-charging the negative material due to dissolution of some of the active elements via release of hydrogen. For example, etching negative materials at elevated temperatures of 120° C. for 2 hours in 60% KOH solution results in the negative pre-charge of approximately 20%. Etching at 30% KOH solution at 80° C. resulted in lower pre-charge in the negative material.

In another embodiment, strong reducing agents, such as borohydride compounds, may be used to precharge the negative active materials. Negative material may be charged chemically by using $KBH_4$ (potassium borohydride) or $NaBH_4$ (sodium borohydride), which are strong reducing agents and can release hydrogen. $KBH_4$ reacts with water according to the following reaction:

$$KBH_4 + 2H_2O = 4H_2 + KBO_2$$

This reaction will occur normally in the presence of a catalyst and metal hydride alloys are good catalysts for this reaction. If metal hydride alloy (M) is present in an alkaline solution containing $KBH_4$, it will react with the hydrogen released by the borohydride and the net reaction may be written as:

$$KBH_4 + 2H_2O + 8M = 8MH + KBO_2$$

Where MH is the metal hydride. The amount of metal hydride formed chemically depends on the amount and concentration of the borohydride solution and the time of reaction. For example, potassium borohydride was introduced into a c-cell containing $AB_5$ Mm negative electrode and nickel hydroxide positive electrode (AP50). Hydrogen gas was seen to come out of the cell and the potential of the negative electrode increased to −0.885V vs Hg/HgO reference electrode indicating an increased state of charge for this electrode. The pre-charged capacity was measured to be 12% of the full negative capacity.

Other strongly reducing hydride materials such as $NaH_2PO_2$ (sodium hypophosphites) and $H_3PO_2$ (hypophosphorous acid) tend like the borohydrides, to release hydrogen from water in the presence of catalyst. Metal hydride alloys are good catalytically to promote this hydrogen evolution and when present in a solution of phosphate compounds they can be charged with hydrogen as in the case of the borohydrides.

In the present disclosure, cobalt additives are intended to include any cobalt containing material capable of producing an overcharge reservoir or precharge section of the negative electrode of a nickel metal hydride battery upon the initial charge of the positive electrode. Preferably, the cobalt additives in the positive electrode have an oxidation potential lower than the positive active material, e.g. nickel hydroxide and nickel oxyhydroxide, and produce a stable oxide upon the initial charge. Cobalt additives include, but are not limited to, cobalt oxide, cobalt metal, cobalt oxyhydroxide and cobalt hydroxide.

The terms nickel hydroxide and nickel hydroxide material, as used throughout the disclosure, are interchangeable terms used to define electrochemically active nickel hydroxide generally exemplified by the equation $NiM(OH)_2$, where M may be none, one, two, three, four, five or more modifiers. The modifiers may be chemical or compositional modifiers. Modifiers, when present, are added in amounts sufficient to improve various performance characteristics of the active material, such as cycle life, charge efficiency, low temperature performance, high temperature performance, power, utilization, etc. These modifiers may be as high as 20 atomic % of the total metal composition. Modifiers provided in amounts higher than 20% tend to reduce capacity below otherwise desirable levels. Preferred modifiers include elements selected from the group consisting of Al, Ba, Bi, Ca, Co, Cr, Cu, F, Fe, In, K, La, Li, Mg, Mn, Na, Ru, Sb, Sn, Sr, Ti, rare earth elements, and Zn. The term nickel hydroxide also includes composite nickel hydroxide, such as multi-layered nickel hydroxide materials, coated nickel hydroxide materials, nickel hydroxide materials having embedded metal particles, etc. Likewise, the term nickel oxyhydroxide, as is used herein, includes any nickel oxyhydroxide material generally exemplified by the equation NiM(OOH), where M may be none, one, two, three, four, five or more modifiers.

Examples of nickel hydroxide formulations that may be preoxidized in accordance with the present invention include those described in U.S. Pat. Nos. 5,523,182; 5,348,822; 5,344,728; and 6,019,955, the disclosures of which are herein incorporated by reference. For further examples of nickel hydroxide materials applicable to the present invention, see U.S. Pat. No. 6,177,210, the disclosure of which is herein incorporated by reference. Disclosed therein is a composite positive electrode material for use in electrochemical cells. The composite material comprises nickel hydroxide particles having a conductive material at least partially embedded within. The embedded material is preferably a conductive metal embedded within the bulk. Preferred positive active materials are substantially spherical, high density, preoxidized nickel hydroxide particles having one or more modifiers. The preoxidized positive active material is preferably partly oxidized. A partly oxidized positive active material reduces reactivity and permits a slower more controlled reaction that reduces heat generation, improves safety and optimizes charge balancing. The preoxidized positive active material is preferably greater than 1% oxidized. The preoxidized active positive material is preferably 80% or less oxidized, is more preferably 3 to 70% oxidized, is more preferably 5 to 55% oxidized. A most preferred material is 10 to 70% oxidized, is more preferably 20 to 60% oxidized and is more preferably 30 to 55% oxidized.

The preoxidized positive active material is preferably a plurality of partially preoxidized nickel hydroxide particles. The particles preferably have an average particle size of 5 to 50 μm. The preoxidized particles are preferably substantially spherical. Substantially spherical, preoxidized particles with an average particle size of 5 to 50 μm allow formation of pasted positive electrodes having high energy density and increased overcharge reservoir stability. The partially preoxidized particles may include: a solid solution of oxidized and non-oxidized active material; layers of oxidized and non-oxidized material; a heterogeneous microcrystalline mixture of oxidized and non-oxidized active material, or a combination of two or more of the above. As referred to herein, microcrystalline materials have a grain size of 50 to 150 angstroms.

The preoxidized particles are preferably greater than 1% oxidized and less than 75% oxidized. The particles are more preferably 3 to 50% oxidized, more preferably 8 to 35% oxidized and more preferably 8 to 20% oxidized.

The preoxidized particles are preferably formed in a non-sintered or pasted electrode. The pasted electrode may be made by mixing the preoxidized material with various additives and/or binders, forming a slurry and applying the past to a conductive substrate. Additional, non-oxidized positive active material may also be blended with the mixture.

EXAMPLES

The following example describes a method of making the encapsulant layer described above using $Ni(OH)_2$ powder and $Co(OH)_2$ powder. Dry nickel hydroxide powder is mixed together with cobalt hydroxide in a mixer, preferably at about a 40:3 ratio of nickel hydroxide to cobalt hydroxide. The dry powders may then be heated up to a temperature of around 190° F. Under continuous mixing the powders are sprayed with a sufficient amount and concentration of NaOH. For example, 1.2 liters of 50% NaOH is sufficient to dissolve 0.9 kg of cobalt hydroxide mixed with 12 kg of nickel hydroxide. The slurry is mixed strongly (high-shear) for a time and at a temperature to facilitate a layer of cobalt hydroxide to be formed around the nickel hydroxide particles, i.e. cobalt hydroxide dissolves and precipitates on the nickel hydroxide particle surface. For example, the slurry may be mixed strongly (high-shear) for 15 minutes at 190° F. to dissolve 0.9 kg of cobalt hydroxide mixed with 12 kg of nickel hydroxide in 1.2 liters of 50% NaOH. The coating procedure may be performed in air, resulting in partial oxidation of the cobalt hydroxide layer to the more conductive (and desired) state of cobalt oxyhydroxide. Oxygen gas is introduced into the mixing chamber and the mixing continues, preferably until all cobalt hydroxide in the encapsulated layer is oxidized. The presence of oxygen allowed for further oxidation of any remaining cobalt hydroxide, in the encapsulated layer, to the cobalt oxyhydroxide state. The material may then be separated, washed with water, dried and screened through a coarse screen, such as a 30 mesh screen.

In the following example of precharge supplied by cobalt additives prepared a variety of ways, a precharge level applied to a negative electrode in a cell was determined by charging positive limited fresh c-cell at C/10 charging rate, then discharge it at C/5 rate to a cutoff voltage of 0.9V. The cell was then opened and flooded with electrolyte. Using Hg/HgO reference electrode, the open circuit potential of the negative electrode was measured and then the negative electrode continued to be discharged to a cutoff potential of −0.6V vs Hg/HgO reference and the amount of excess charged on the negative was determined. This experiment was repeated with c-cells having different positive electrodes. All of the cells included the same Mm negative electrodes.

The standard (control) positive electrodes contained 5%Co and 6% CoO powder additives added to the $Ni(OH)_2$ paste. Electrodes were prepared using either ethanol as the pasting media and polyvinyl acetate (PVA) binder or using water as the pasting liquid and carboxymethyl cellulose (CMC) as a thickener/binder. Electrodes were also prepared from $Ni(OH)_2$ powder encapsulated with $Co/Co(OH)_2$ in a paste with 1% $Co(OH)_2$ powder additive. In this case electrodes were also prepared by either using ethanol or water as the pasting media.

Figure 3:
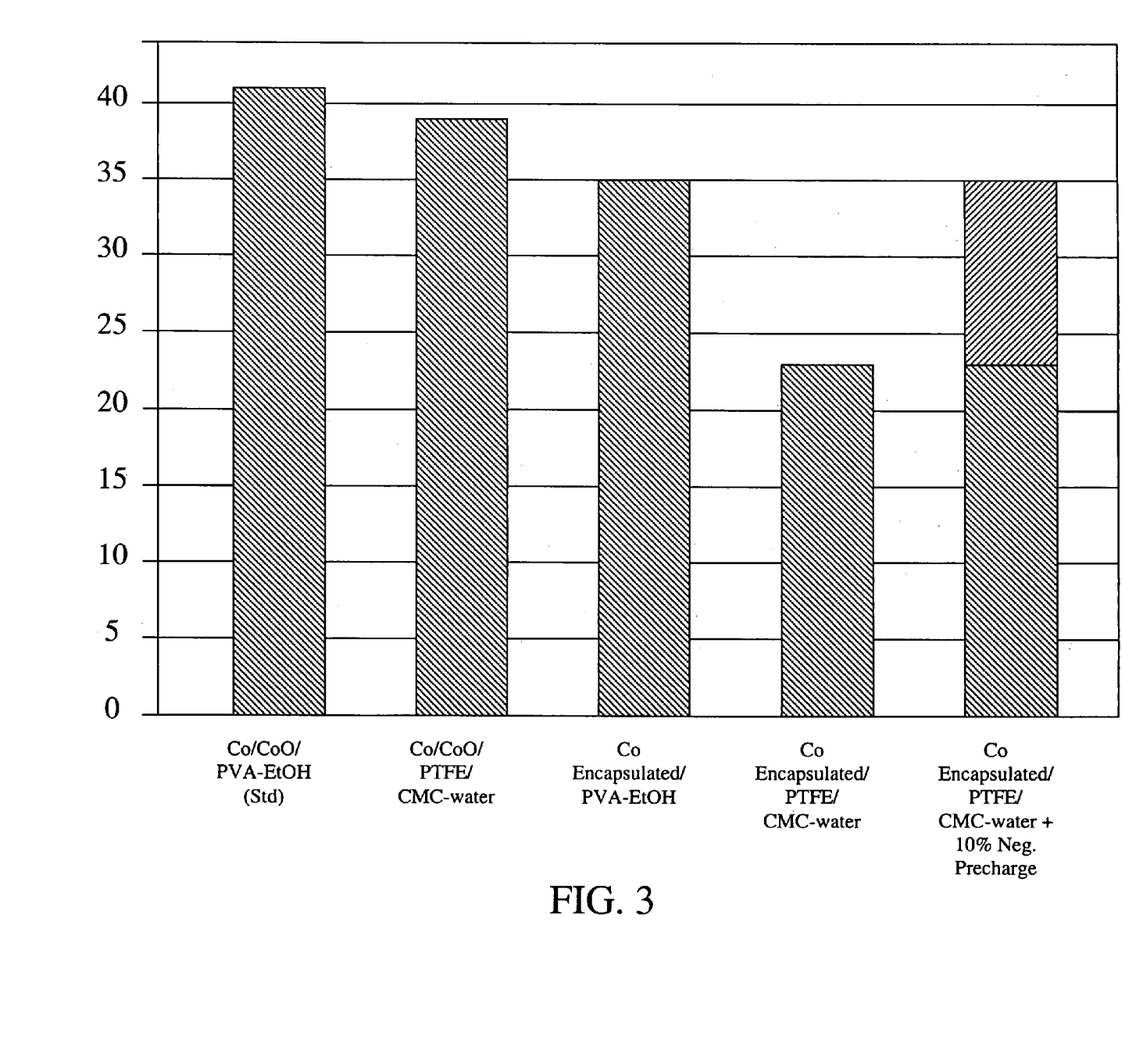
FIG. 3 is a bar graph illustration that compares the effects of various positive electrode active material formulations of the present invention on negative excess charge.

Table III below shows the percent (%) of excess charge with respect to the positive electrode's capacity in cells that included the different types of positive electrode material. The cells were designed with a negative /positive (NI/P) capacity ratio of 1.5. A bar graph comparison for the % excess charge of the positive electrodes is illustrated in FIG. 3.

TABLE III

| Positive electrode | % excess charge with respect to positive capacity |
|---|---|
| Co/CoO-ethanol based paste(control) | 40.5 |
| Co/CoO-water based paste | 39 |
| Co encapsulated - ethanol based paste | 34.5 |
| Co encapsulated - water based paste | 22.5 |

The level of pre-charge in the negative can be tailored by the design of the positive electrode, such as N/P ratio and cobalt additive. In the standard positive material pasted with the addition of 5% Co and 6% CoO and using alcohol or water based pasting, the pre-charge measured on the negative electrode was found to be approximately 40.5%. In this example, wherein the N/P ratio is 1.5, the corresponding precharge in the negative electrode will be approximately 27%. This matches with the level predicted from calculating the amount of charge associated with oxidation of all the Co metal and the CoO present in the positive electrode. The excess positive charge is lower in the case of Co encapsulated electrodes. In the case of Co-encapsulated positive pasted using water as the pasting media the excess of positive was lower, i.e. approximately 22.5%. In this example, wherein the N/P ratio is 1.5, the corresponding precharge in the negative electrode will be approximately 15%. The electrochemical performance of the cells using the Co-encapsulated positive though was similar to that of cells which included the higher Co levels, 5% Co and 6% CoO added as powders to the paste mix. The Co-encapsulated positive is a cheaper electrode because of the lower Co content (7% Co encapsulated +1% $Co(OH)_2$ powder). If larger amounts of excess charge on the negative electrode is required, the additional excess charge can be added by different methods as described above, e.g. NiAl in the negative electrode, hydrogen gas in the negative electrode, etching the negative electrode or borohydride in the negative electrode. FIG. 3 describes how the excess negative charge can be tailored by using partial pre-charging (by thermal absorption of hydrogen gas) and Co-encapsulated positive active particles in the positive electrode.

The foregoing is provided for purposes of explaining and disclosing preferred embodiments of the present invention. It will be apparent to those skilled in the art that variations and modifications of the present invention can be made without departing from the scope or spirit of the invention. For example, the incorporation of various hydrogen storage alloys, electrolyte or positive active material, will be apparent to those skilled in the art. These changes and others may be made without departing from the scope or spirit of the invention in the following claims.

We claim:

1. A nickel metal hydride battery comprising:
   a negative electrode having negative active material;
   a positive electrode electrochemically coupled to the negative electrode; and
   an electrolyte,
   said negative electrode having a precharge sufficient for long cycle life, at least a portion of said precharge supplied by chemically reducing the negative active material; said electrolyte having a strong reducing agent, said chemically reducing comprising a sufficient amount of electrolyte having a strong reducing agent reacting with said negative active material producing hydrogen gas.

2. The nickel metal hydride battery of claim 1, said positive electrode including positive electrode active material, at least one positive electrode additive and at least one positive electrode binder.

3. The nickel metal hydride battery of claim 2, said positive electrode binder comprising a non-oxidizable binder.

4. The nickel metal hydride battery of claim 2, said positive electrode active material having a precursor coating, said precursor coating including cobalt.

5. The nickel metal hydride battery of claim 2, said positive electrode additive comprising no more than 2% cobalt.

6. The nickel metal hydride battery of claim 1, said negative electrode having a negative electrode oxidizable additive providing long cycle life upon oxidation and having conductivity, said negative electrode oxidizable additive having a component that harmlessly leaches out into the electrolyte upon cycling of the battery.

7. The nickel metal hydride battery of claim 2, said positive electrode additive predominantly providing said precharge in the negative electrode.

8. The nickel metal hydride battery of claim 1, said precharge further supplied by exposing the negative active material to hydrogen gas.

9. The nickel metal hydride battery of claim 1, said chemically reducing further comprising a sufficient amount of NiAl in said negative electrode reacting with said electrolyte producing hydrogen gas.

10. The nickel metal hydride battery of claim 1, said strong reducing agent selected from the group consisting of sodium borohydride and potassium borohydride.

11. The nickel metal hydride battery of claim 1, said strong reducing agent selected from the group consisting of sodium hypophosphites and hypophosphorous acid.

12. The nickel metal hydride battery of claim 1, said negative active material comprising an alloy having elements reactive with an alkaline solution, said chemically reducing comprising etching said negative active material in said alkaline solution.

13. The nickel metal hydride battery of claim 2, said positive electrode binder including carboxymethyl cellulose.

14. The nickel metal hydride battery of claim 2, said positive electrode binder including polyvinyl acetate.

15. The nickel metal hydride battery of claim 2, said positive electrode active material comprising nickel hydroxide particles encapsulated with a cobalt material.

16. The nickel metal hydride battery of claim 15, said cobalt material forming a conductive network.

17. The nickel metal hydride battery of claim 15, said cobalt material comprising a member selected from the group consisting of cobalt hydroxide, cobalt oxyhydroxide and a combination thereof.

18. The nickel metal hydride battery of claim 6, said negative electrode oxidizable additive comprising nickel aluminum.

19. The nickel metal hydride battery of claim 15, said positive electrode binder including carboxymethyl cellulose.

20. The nickel metal hydride battery of claim 15, said positive electrode binder including polyvinyl acetate.

21. The nickel metal hydride battery of claim 4, said precursor coating providing a minority of said precharge.

22. The nickel metal hydride battery of claim 4, said precursor coating comprising cobalt oxyhydroxide.

23. The nickel metal hydride battery of claim 4, said positive electrode active material having positive active particles, said precursor coating encapsulating said positive active particles prior to construction of said positive electrode.

* * * * *